Patented June 10, 1941

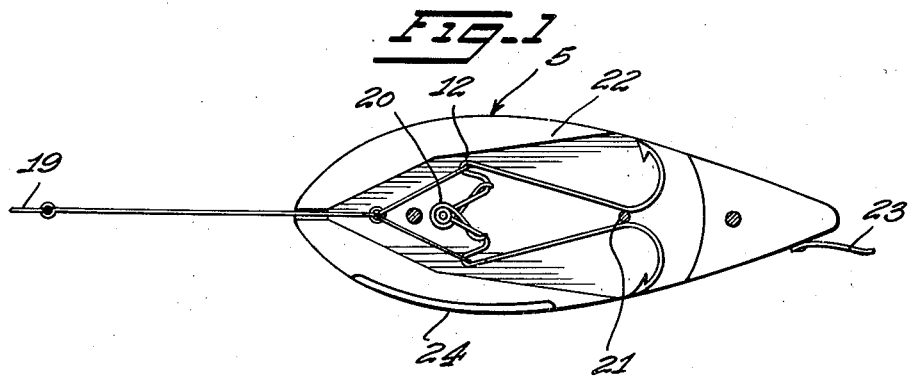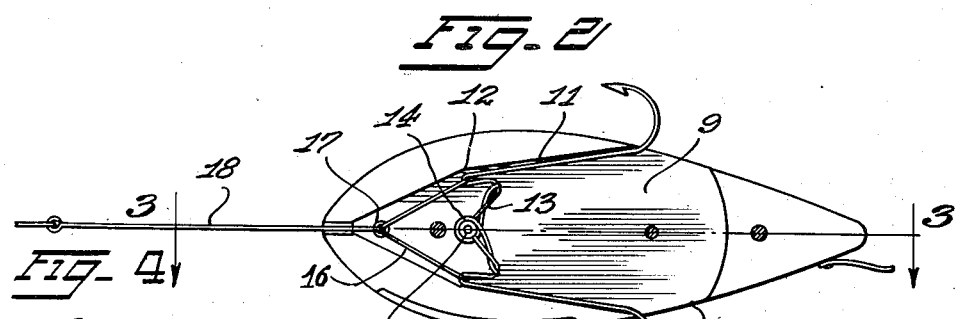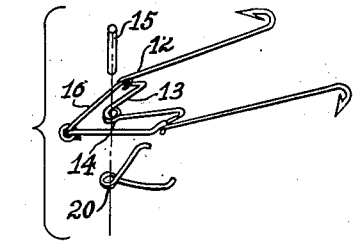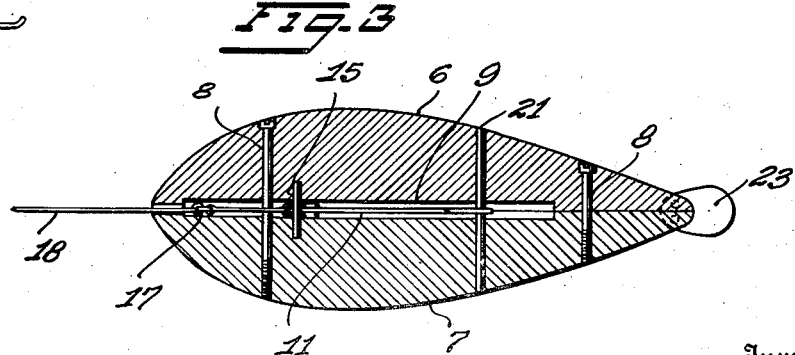

2,244,980

UNITED STATES PATENT OFFICE 2,244,980

FISH LURE

George A. Abramson, Iron, Minn.

Application August 24, 1939, Serial No. 291,780

7 Claims. (Cl. 43—37)

This invention relates to fish lures and more particularly to a weedless lure.

The object of the invention is to provide a fish lure of simple and inexpensive construction in which the hooks are normally housed within the body of the lure so as to prevent the lure from becoming entangled in grass, weeds or the like when making a casting, the construction of the device being such that, when a fish takes the bait or lure, the pull on the lure will automatically move the hooks to extended position and thus impale the fish on the barbed ends of said hook.

A further object of the invention is to provide a fish lure comprising coacting sections provided with an intermediate recess for the reception of the hook actuating mechanism, the rear end of the lure being provided with a spoon for imparting motion to the bait when pulled through the water and one or both of said sections being weighted to keep the lure at all times on an even keel.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a plan view of one of the sections comprising the lure showing the hooks in retracted or inoperative position, Figure 2 is a similar view showing the hooks in extended or operative position, Figure 3 is a vertical sectional view taken on the line 3—3 of Figure 2, and Figure 4 is a detail perspective view showing the parts separated and in position to be assembled on the pin.

The improved fish lure forming the subject-matter of the present invention comprises a body portion 5 preferably ovate in contour and formed of wood, hard rubber or suitable plastic material, said body portion being formed in two sections 6 and 7 fastened together by transverse screws or similar fastening devices 8.

The confronting faces of the sections 6 and 7 are cut-away to form a recess 9 opening through the opposite sides of the body portion, as indicated at 10, and pivotally mounted for lateral movement within said recess 9 are coacting hooks 11. The shank of each hook 11 is bent to form a loop 12 disposed parallel therewith and is then bent inwardly to form an arm 13 terminating in an eye 14 which fits around a pivot pin 15. Pivotally connected with the loops 12 are diverging links 16, the outer ends of which engage a ring 17 fastened to a leader 18 which, in turn, is secured to the fishing line, indicated at 19. Coiled around the pivot pin 15 is a spring 20, the opposite ends of which bear against the arms 13 in proximity to the loops 12. The tension of the spring 20 is such as to normally and yieldably hold the hooks housed within the recess 9 and against a suitable stop pin 21 extending through the body sections, as best shown in Figure 1 of the drawing. Should a fish, however, attempt to take the bait, the longitudinal pull exerted by the fish on the body portion or lure will cause the links 16 to move the barbs of the hook outwardly through the openings 10 and thus impale the fish thereon, as will be readily understood.

It will here be noted that the inner walls 22 of the body sections form stops for limiting the outward swinging movement of the shanks of the hooks while the pin 21 limits the inward swinging movement of said hooks. The rear or tapered end of the body portion is preferably provided with a spoon 23 to impart the desired motion to the bait when pulled through the water and one or both of the body sections are also preferably weighted, as indicated at 24, so as to keep the lure on an even keel at all times.

Inasmuch as the hooks are normally housed within the recess 9, liability of the lure becoming entangled in grass, weeds and the like when fishing or making a casting is effectually prevented.

It will thus be seen that, when a fish takes the bait, the hooks will automatically move outwardly against the tension of the spring 20 to impale the fish and when the fish is removed the tension of the spring 20 will automatically return the hooks to inoperative position within the seating recess 9 of said body portion.

It will, of course, be understood that the devices may be made in different sizes and shapes and painted or otherwise coated in any color to make them attractive to the fish.

Having thus described the invention, what is claimed as new is:

1. A fish lure comprising a body portion provided with a recess opening through opposite sides thereof, hooks pivotally mounted for lateral movement within the recess and having their inner ends provided with eyes, a pivot pin extending through said eyes, a spring coiled around the pivot pin and provided with arms engaging the hooks for holding said hooks in retracted position, and a line operatively connected with the hooks for moving the hooks to extended position when a pull is exerted on said body portion.

2. A fish lure comprising a body portion having a recess opening through opposite sides thereof, hooks pivotally mounted for lateral movement within the recess and having their inner ends provided with eyes, a pivot pin extending through said eyes, a spring coiled around the pivot pin and provided with diverging arms engaging the hooks for holding said hooks normally in retracted position, diverging links connected with the hooks, and a leader having means for engagement with the links and a fishing line respectively whereby when a pull is exerted on the body portion the bills of the hooks will be moved outwardly through said openings to operative position.

3. A fish lure comprising a body portion having a recess opening through opposite sides thereof, fish hooks pivotally mounted for lateral movement within the recess and each comprising a shank formed with a loop terminating in an eye, a pivot pin extending through said eyes, a spring coiled around the pivot pin and provided with diverging arms engaging the hooks adjacent said loops for normally holding the free ends of the hooks within the recess, and diverging links connected with the loops and having means for connection with a fishing line whereby when a pull is exerted on the body portion the hooks will automatically be moved to extended position through said openings.

4. A fish lure comprising a body portion formed of mating sections, the confronting faces of which are cut away to form a recess opening through opposite sides of the body portion, fastening devices extending through the sections of the body portion, a pivot pin connecting said sections, hooks pivotally mounted for lateral movement within the recess and each provided with a loop having an arm terminating in an eye fitting around the pivot pin, a coiled spring encircling the pivot pin and engaging the hooks adjacent said loops for normally holding the bills of the hooks in retracted position, and diverging links connected with the loops and having means for engagement with a fishing line whereby when a pull is exerted on the body portion the hooks will be automatically moved to extended position.

5. A fish lure comprising a body portion having a recess opening through opposite sides thereof, a stop pin disposed within the recess, hooks pivotally mounted for lateral movement within the recess and having their inner ends provided with eyes, a pivot pin extending through said eyes, a spring coiled around the pivot pin and engaging the hooks for normally holding the bills of the hooks in retracted position against the stop pin, said recess being provided with oppositely disposed inclined walls constituting stops, a leader for attachment to a fishing line, and links forming a pivotal connection between the leader and hooks whereby when a pull is exerted on the body portion the hooks will be automatically moved outward against said stops.

6. A fish lure comprising a body portion having a recess opening through opposite sides thereof and provided with inclined shoulders extending in the direction of the openings, a stop pin arranged within the recess, hooks pivotally mounted for lateral movement within said recess and normally bearing against the stop pin, one end of each hook being bent to form a loop and thence bent inwardly to form an arm terminating in an eye, a pivot pin extending through said eyes, a spring encircling the pivot pin and bearing against the arms for normally holding the free ends of the hooks against the stop pin, said body portion having an opening in the forward end thereof, a leader extending through said opening for attachment to a fishing line, and diverging links operatively connected with the leader and loops of the hook respectively whereby when a pull is exerted on the body portion the hooks will automatically be moved outwardly in engagement with said stop shoulders with the bills of the hooks projecting beyond the outer surface of said body portion.

7. A fish lure comprising a sectional body portion having a recess formed therein and opening through opposite sides of the body portion, hooks pivotally mounted for lateral movement within the recess and each provided with a loop having an arm extending therefrom and terminating in an eye, a pivot pin extending through said eyes, a stop pin, a spring coiled around the pivot pin and engaging the arms of the hooks for normally holding the free ends of the hooks against said stop pin, diverging links connected with the loops of the hooks, a ring connected with the converging ends of the links, and a leader fastened to the ring for attachment to a fishing line whereby when a pull is exerted on the body portion the hooks will automatically be moved outwardly through the openings in said body portion.

GEORGE A. ABRAMSON.